United States Patent

[11] 3,595,253

[72] Inventors Julio G. Yanez-Pastor
1390 Solano Drive, Pacifica, Calif. 94044;
Antonio Toro, 138 Irvington St., Daly City, Calif. 94014
[21] Appl. No. 869,449
[22] Filed Oct. 20, 1969
[45] Patented July 27, 1971
Continuation of application Ser. No. 681,792, Nov. 9, 1967, now abandoned.

[54] PORTABLE DISHWASHER FOR USE IN SINK
7 Claims, 2 Drawing Figs.
[52] U.S. Cl. ............................................... 134/115 R, 134/199, 239/567
[51] Int. Cl. .................................................. B08b 3/02
[50] Field of Search ................................... 134/170, 198; 239/550, 556, 557, 567

[56] References Cited
UNITED STATES PATENTS
| 1,209,263 | 12/1916 | Clauss | 134/199 UX |
| 1,200,289 | 10/1916 | Witteman | 134/199 |
| 1,738,839 | 12/1929 | McClintock | 134/200 |
| 1,983,931 | 12/1934 | Carter | 134/94 |
| 2,046,311 | 7/1936 | Carter | 134/94 |
| 2,116,101 | 5/1938 | Currens | 134/200 X |
| 2,239,110 | 4/1941 | Mahoney | 134/199 |
| 2,407,533 | 9/1946 | Brock | 134/199 |
| 2,896,642 | 7/1959 | Lilly | 134/199 X |

FOREIGN PATENTS
| 183 | 7/1875 | Great Britain | 134/171 |

Primary Examiner—Daniel Blum
Attorney—Joseph F. Cole

ABSTRACT: A portable dishwasher for use in a sink having an open meshwork basket adapted to be removably placed in a sink basin to hold dishes and other eating utensils, the basket being made from tubes having perforations to discharge jets of water during washing and rinsing operations. Water is supplied to the tubes by a hose connected to a faucet, and an inverted cup-shaped cover is placed over the basket and its contents to confine the water jets, this cover having a rim at its lower end resting on the bottom wall of the basin.

PATENTED JUL27 1971

3,595,253

INVENTORS
JULIO G. YANEZ-PASTOR
ANTONIO TORO
BY
*Joseph F. Cole*
ATTORNEY 3,595,253

PORTABLE DISHWASHER FOR USE IN SINK

CROSS REFERENCE TO RELATED APPLICATION

The instant application is a continuation of Ser. No. 681,792, filed Nov. 9, 1967, now abandoned.

SUMMARY

An object of our invention is to provide a portable dishwasher that may be removably placed in the basin of a sink, the dishwasher having a basket made from tubes formed with perforations through which jets of water may be discharged for washing and rinsing dishes and other eating utensils that are held in the basket. Particles of food will be washed down the ordinary drain of the sink. Moreover, a cover is designed to fit over the basket and its contents so as to confine the jets of water, and this cover may be positioned over the basket, or removed therefrom, while the basket remains in the sink basin. However, the basket may be removed from the sink and placed on the drainboard for drying of the dishes and other eating utensils. A hose is provided for connecting a water faucet to the tubes of the basket.

Another object of our invention is to provide a portable dishwasher for use in a sink that is simple in construction, durable and efficient for the purpose intended, and which may be manufactured at a relative low cost.

Other objects and advantages will appear as the specification proceeds, and the novel features of our invention will be pointed out in the appended claims.

BRIEF DESCRIPTION OF THE DRAWING

For a better understanding of our invention, reference should be had to the accompanying drawing, forming part of this specification, in which.

Figure 1:
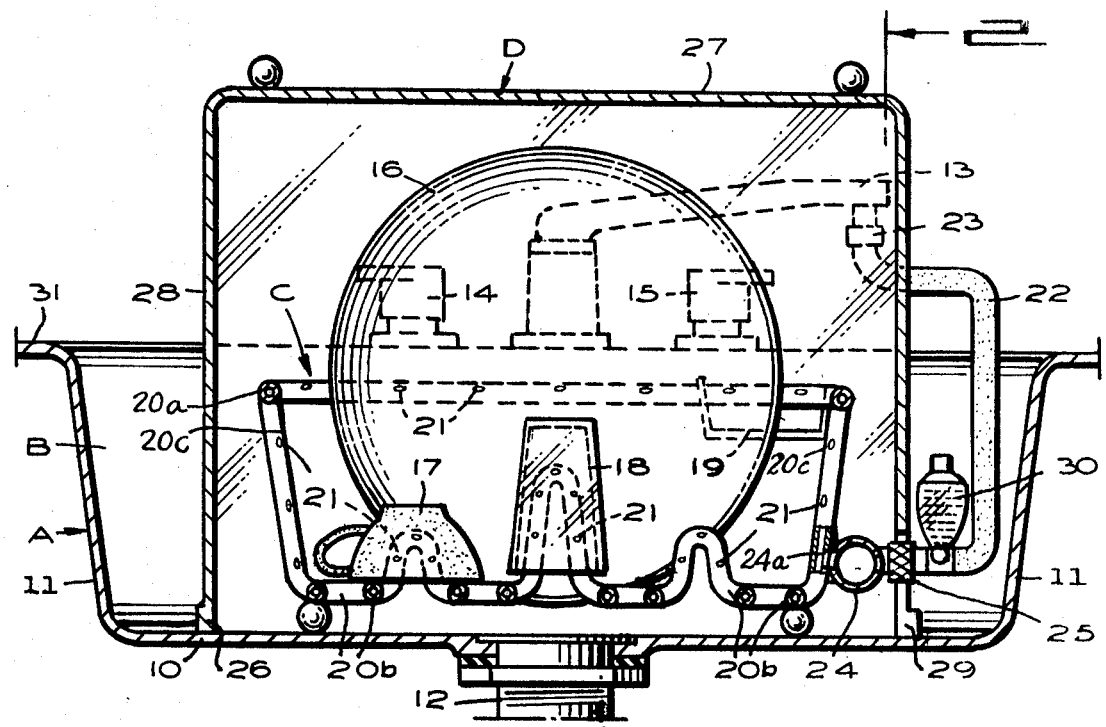
FIG. 1 is a vertical longitudinal sectional view taken through a conventional sink, and showing our portable dishwasher mounted therein.
Figure 2:
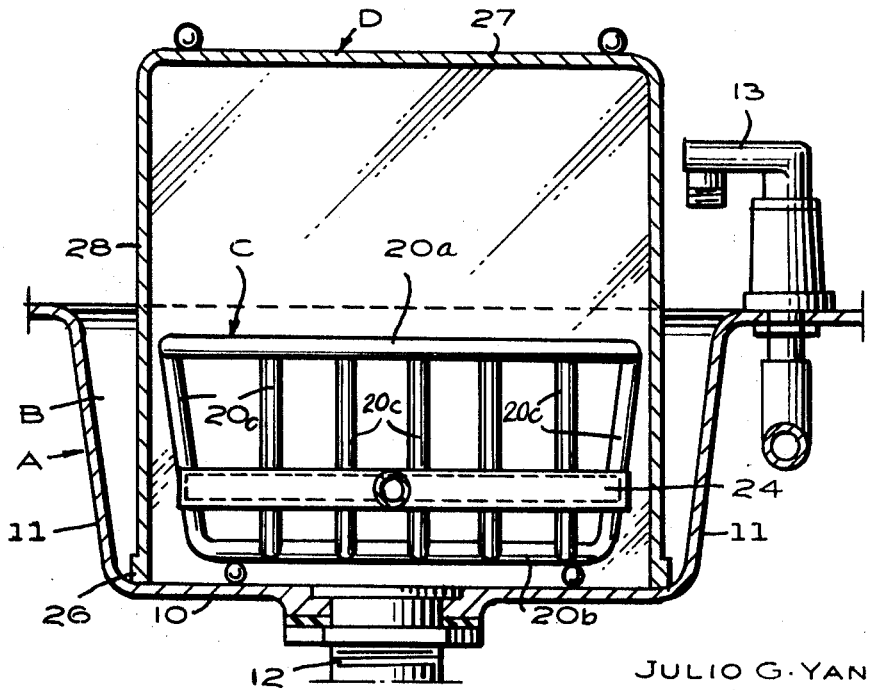
FIG. 2 is a transverse sectional view taken along the line 2—2 of FIG. 1.

While we have shown only the preferred embodiment of our invention, it should be understood that various changes, or modifications, may be made within the scope of the appended claims without departing from the spirit thereof.

DETAILED DESCRIPTION OF THE PREFERRED EMBODIMENT

Referring now to the drawing in detail, we have shown a sink A defining a basin B having bottom and sidewalls 10 and 11, respectively, the bottom wall being provided with a drain outlet fitting 12 of conventional arrangement communicating with the basin, and the sink further being provided with a water faucet 13, the latter being supplied with hot and cold water by valves 14 and 15, respectively.

It will be noted that we provide an open meshwork basket or rack C removably disposed in the basin B and resting on the bottom wall 10, the basket being made to hold dishes, such as plates 16, cups 17, glasses 18, and a tray 19 may be used for silverware. Of course, other eating utensils may be placed in the basket.

The basket C is made up from tubes 20a, 20b and 20c as described below 20 that communicate with one another, and these tubes have perforations 21 arranged to spray jets of water over the dishes and other kitchen utensils disposed in the basket. During the washing operation, the dirty water and food particles will be washed down the drain outlet fitting 12. The basket C includes an upper endless tube 20a defining a top rim, said tube having perforations directing water inwardly over upper portions of the utensils. The basket further includes bottom tubes 20b arranged under the utensils and also upwardly extending tubes 20c disposed at the sides and ends thereof. The bottom tubes 20b have perforations directing water upwardly and the upwardly extending tubes 20c have perforations directing water inwardly against the utensils.

A flexible hose 22 has one end thereof connected to the faucet 13 by a coupling 23, and the other end of the hose is arranged to deliver water from the faucet to the tubes 20a, 20b and 20c of the basket C when the faucet is opened. Of course, the valves 14 and 15 control the degree of temperature of the delivered water.

In detail, a hollow header 24 communicates with the the openings 24a in the tubes 20c of the basket C, the header having a capacity to fill all of the tubes with water so that an adequate supply of water will be furnished for washing operations. The hose is connected to the header by a coupling 25 (see FIG. 1).

An inverted cup-shaped cover D is removably placed in the basin B and has a marginal rim 26 at its lower end resting on the bottom wall 10 of the basin, this cover being dimensioned to enclose the basket C and the dishes and other utensils in the basket. The cover C defines top and depending sidewalls 27 and 28, respectively. Steam will form on the interior of the cover due to hot water.

As shown in FIG. 1, the depending wall 28 has a notch 29 extending upwardly thereinto from the marginal rim 26 of the cover so as to receive the lower part of the hose 22, whereby the cover may be placed over the basket or removed, while the basket is disposed in the basin.

Detergent or liquid soap may be placed in a dispenser 30 so as to deliver the detergent or soap to the water flowing to the header 24 and tubes 20a, 20b and 20c during the washing operation. This dispenser may be closed when it is desired to use jets of clear water for rinsing the dishes and other utensils.

This portable dishwasher has been designed for use in small homes and apartments, where the dishes are accumulated until there are enough on hand to warrant washing them. However, we do not wish to be limited in this respect.

After the dishes and utensils have been washed and rinsed, the cover D may be lifted out of the basin, and then the basket and its contents placed on the sinkboard 31 for air drying, and this will not require the removal of the contents from the basket.

It will be apparent that the cover D may be turned upside down so that its rim 26 faces upwardly, and then the basket C may be placed therein, and then both placed in a cabinet or other place for storage.

We claim:

1. A portable dishwasher for use in a sink, wherein the sink defines a basin having bottom and sidewalls, the bottom wall being provided with a drain outlet fitting communicating with the basin, and the sink further being provided with a water faucet, the dishwasher comprising:

a. an open meshwork basket removably disposed in the basin and resting on the bottom wall thereof, the basket being made to hold dishes and other utensils for washing and rinsing operations;

b. the open meshwork of the basket defining tubes communicating with one another and having perforations arranged to spray jets of water over the dishes and other utensils disposed in the basket;

c. a flexible hose having one end thereof coupled to the faucet to receive water therefrom, and the other end of the hose being arranged to deliver the water to the tubes when the faucet is opened;

d. an inverted cup-shaped cover defining top and depending sidewalls, the cover being removably placed in the basin and having a marginal rim at its lower end resting on the bottom wall of the basin, the cover being dimensioned to enclose the basket and the dishes and other utensils disposed in the basket;

e. and a hollow header communicating with the tubes of the basket, and said other end of the hose being coupled to the header to deliver water from the faucet to the interior of the header, the header having a capacity to fill the tubes with water.

2. The portable dishwasher for use in a sink, as set forth in claim 1;

f. and in which one of the depending walls of the cover has a notch extending upwardly thereinto from the marginal rim of the cover, with the notch receiving the hose, whereby the cover may be placed over the basket or removed, while the basket is disposed in the basin.

3. In a portable dishwasher for use in a sink:
a. an open meshwork basket made to be removably disposed in a basin of a sink to rest on a bottom wall thereof, the basket being made to hold dishes and other utensils for washing and rinsing operations;
b. the basket defining an upper endless tube defining its top rim, bottom tubes arranged under the dishes and other utensils, and upwardly extending tubes disposed at the sides and ends of the basket, all of these tubes communicating with one another;
c. means operable to deliver water to the tubes of the basket;
d. the upper tube having perforations arranged therein to direct jets of water over the upper portions of the dishes and other utensils, the bottom tubes having perforations therein arranged to direct jets of water against the dishes and other utensils from below, and the upwardly extending tubes having perforations therein arranged to direct jets of water against the dishes and other utensils from the sides and ends of the basket;
e. and an inverted cup-shaped cover defining top and depending walls, the cover being dimensioned to be placed in the basin and having a marginal rim at its lower end for resting on the bottom wall of the basin, with the cover enclosing the basket and its dishes and other utensils, the cover being made to be freely lowered over the basket or removed therefrom while the basket remains in the basin.

4. In a portable dishwasher:
a. a basket made to hold dishes and other utensils for washing and rinsing operations;
b. the basket providing upper tubes disposed to retain the dishes and other utensils in position and bottom tubes arranged under the dishes and other utensils, the upper and bottom tubes forming a rack for supporting the dishes and other utensils;
c. water-delivering means including a header communicating with all of the tubes and operable to deliver water to the tubes, the header having a capacity to fill the tubes with water;
d. the upper tubes having perforations arranged therein to direct jets of water over the upper portions of the dishes and other utensils, and the bottom tubes having perforations therein arranged to direct jets of water against the dishes and other utensils from below;
e. and an inverted cup-shaped cover defining top and depending walls, the cover being dimensioned for being removably placed over the basket so as to prevent the water from being splashed upwardly out of the dishwasher during washing and rinsing operations.

5. The portable dishwasher, as set forth in claim 4;
f. and in which the water-delivering means includes a hose connected to the header, and the cover being freely insertable over the basket or removable therefrom, without disturbing the hose and the basket.

6. The portable dishwasher, as set forth in claim 4;
g. and in which other tubes are provided and located between the upper and bottom tubes, and said other tubes having perforations therein arranged to direct jets of water against intermediate portions of the dishes and other utensils contained in the basket.

7. The portable dishwasher, as set forth in claim 6;
h. and in which said other tubes communicate with the upper and bottom tubes so that water will flow through all of the tubes of the basket.